United States Patent [19]

Yagi et al.

[11] E Re. 30,599

[45] Reissued May 5, 1981

[54] IGNITION TIMING CONTROL FOR ENGINE

[75] Inventors: Toru Yagi; Akihisa Nakamura, both of Tokyo, Japan

[73] Assignee: Honda Giken Kogyo Kabushiki Kaisha, Tokyo, Japan

[21] Appl. No.: 145,666

[22] Filed: May 1, 1980

Related U.S. Patent Documents

Reissue of:

[64] Patent No.: 4,133,324
Issued: Jan. 9, 1979
Appl. No.: 811,244
Filed: Jun. 29, 1977

[30] Foreign Application Priority Data

Jul. 7, 1976 [JP] Japan ..... 51-89348[U]

[51] Int. Cl.[3] ..... F02P 5/04

[52] U.S. Cl. ..... 123/408; 123/418

[58] Field of Search ..... 123/117 A, 117 R, 119 EC, 123/408, 418

[56] References Cited

U.S. PATENT DOCUMENTS

| | | | |
|---|---|---|---|
| 3,685,502 | 8/1972 | Oberdoreck | 123/119 EC |
| 3,687,120 | 8/1972 | Lenz | 123/117 A |
| 3,923,023 | 12/1975 | Ito | 123/117 |
| 4,027,633 | 6/1977 | Otsubo | 123/117 A |
| 4,077,373 | 3/1978 | Nakano | 123/117 |

*Primary Examiner*—Ronald B. Cox
*Attorney, Agent, or Firm*—Lyon & Lyon

[57] ABSTRACT

Spark timing control apparatus for an internal combustion engine having a throttle controlled intake passage for an air-fuel mixture. A vehicle is powered by the engine. A vacuum line from the intake passage downstream from the throttle valve is connected to a three-way valve which, in turn, has one conduit connected to a spark advance chamber and another conduit connected to a spark retard chamber. Another valve closes the vacuum line when the engine temperature is low. An electrical switch sensitive to velocity of the vehicle actuates the three-way valve electromagnetically to connect the vacuum line to either of said chambers for actuating a movable member which controls the ignition timing of the engine. The conduit leading to the spark retard chamber also leads to a vacuum chamber in an additional fuel supply system having a valve, so that when the spark is retarded the additional fuel supply is cut off.

3 Claims, 1 Drawing Figure

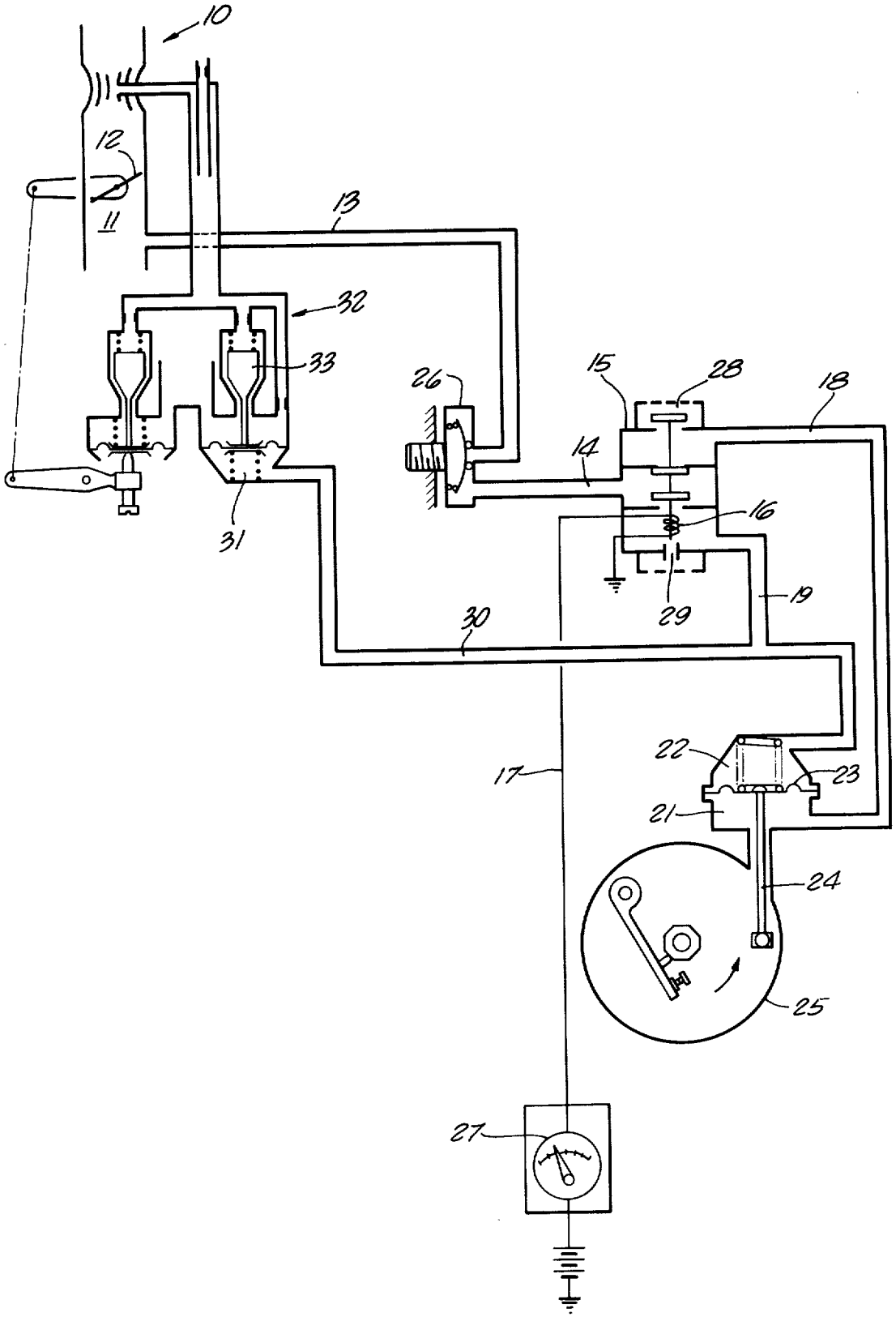
10
12
11
13
32
33
26
15
28
18
14
16
29
19
31
30
22
23
17
21
24
25
27

IGNITION TIMING CONTROL FOR ENGINE

Matter enclosed in heavy brackets [ ] appears in the original patent but forms no part of this reissue specification; matter printed in italics indicates the additions made by reissue.

This invention relates to spark timing control apparatus for internal combustion engines. The general object is to regulate the spark timing in accordance with engine temperature and in accordance with speed of the vehicle powered by the engine. Thus, no correction is made to spark timing whenever the engine temperature is below a predetermined value. When the engine temperature exceeds that value, a correction is applied to the spark timing to advance the timing when the vehicle speed exceeds a predetermined value, and to retard the timing when the vehicle speed is less than that value. When the spark is retarded the additional fuel supply is cut off. It is an important feature of this invention to accomplish this mode of operation in an economical and reliable manner.

These objects are accomplished by providing a vacuum line from the engine intake passage at a location downstream from the throttle valve, and connecting a three-way valve to this vacuum line. Another valve closes the vacuum line whenever the engine temperature is below a predetermined value. The three-way valve is operated by a device sensitive to speed of the vehicle which is powered by the engine, so that at high speed vacuum pressure from said vacuum line is delivered through one conduit to a vacuum advance chamber, while at low speed vacuum pressure from said vacuum line is delivered through another conduit to a vacuum retard chamber. The relative intensities of the vacuum pressure in the two chambers determines the resultant force to be applied to a movable member which controls the spark timing for the engine. When the spark is retarded the additional fuel supply is cut off.

Other and more detailed objects and advantages will appear hereinafter.

The drawing is a schematic diagram showing a preferred embodiment of this invention.

Referring to the drawing, an internal combustion engine generally designated 10 is provided with an intake passage 11 for an air-fuel mixture, and a throttle valve 12 is positioned in this intake passage. A vacuum line 13 communicates with the intake passage at a location downstream from the throttle valve 12 and is connected at 14 to a three-way valve generally designated 15. The three-way valve 15 is normally biased to the position shown in the drawing, but may be moved to a second position upon energizing of a solenoid 16 through an electrical circuit 17. In the position shown in the drawing, the second conduit 19 is connected to the vacuum line 13, and when the solenoid is actuated, the first conduit 18 is connected to the vacuum line 13. The first conduit 18 is connected to a spark advance chamber 21, and the second conduit 19 is connected to a spark retard chamber 22. These chambers are separated by a vacuum response member comprising a flexible diaphragm 23. A movable member 24 actuated by the diaphragm 23 turns the point base 25 to advance or retard the spark timing of the engine.

A valve 26 having a bimetallic element is positioned in the vacuum line 13 and serves to close the vacuum line when the engine temperature is below a predetermined value.

An electrical switch 27 is positioned in the electrical circuit 17 and serves to energize the solenoid 16 whenever the speed of the vehicle exceeds a predetermined value.

When the three-way valve 15 is in the position shown in the drawing, with the vacuum line 13 connected to the second conduit 19, the first conduit 18 is vented to atmosphere through a relatively large opening 28. When the solenoid 16 is actuated to connect the vacuum line 13 to the first conduit 18, the second conduit 19 is vented to atmosphere through a relatively small orifice opening 29. Accordingly, retarding of the spark occurs rapidly when the vehicle speed falls below a predetermined value, but advancing of the spark occurs more slowly when the vehicle speed exceeds the predetermined value.

In operation, no correction is applied for retarding or advancing the spark timing so long as the engine temperature remains below a predetermined value, at which time the temperature sensitive valve 26 remains closed. When the engine warms up, vacuum pressure from the intake passage 11 downstream from the throttle valve 12 is delivered through vacuum line 13 to the three-way valve 15. If the vehicle speed is below a predetermined value, the velocity sensitive switch 27 remains open and the solenoid 16 remains de-energized, so that vacuum pressure from the vacuum line 13 is delivered through second conduit 19 to the spark retard chamber 22. At this time the first conduit 18 is vented to atmosphere through opening 28 and the result is that the flexible diaphragm 23 acts to retract the member 24 to retard the spark timing. When the vehicle speed exceeds a predetermined value, the velocity sensitive switch 27 closes the electrical circuit through the solenoid 16, acting to vent the second conduit 19 through the orifice 29 and to deliver vacuum pressure from the vacuum line 13 through the first conduit 18 to the spark advance chamber 21. This causes the flexible diaphragm 23 to project the member 24 slowly to advance the spark timing of the engine. The conduit 30 is connected to the spark retard conduit 19 and to the vacuum chamber 31 of the additional fuel supply system 32. Vacuum pressure in the chamber 31 acts to close the valve 33 to cut off the supply of additional fuel to the engine.

Having fully described our invention, it is to be understood that we are not to be limited to the details herein set forth but that our invention is of the full scope of the appended claims.

We claim:

1. For use with an internal combustion engine connected to drive a vehicle, the engine having an intake passage for an air-fuel mixture and provided with a throttle valve, the improvement comprising, in combination: a vacuum line communicating with the intake passage downstream from the throttle valve, a three-way valve connected to said vacuum line, means including a movable member for controlling the ignition timing of said engine, a vacuum responsive device including a flexible diaphragm connected to said member, walls forming a spark advance chamber on one side of said diaphragm and forming a spark retard chamber on the other side of said diaphragm, a first conduit connecting said three-way valve to said spark advance chamber, a second conduit connecting said three-way valve to said spark retard chamber, electromagnetic means for moving said three-way valve to connect said vacuum line to either said first first conduit or to said second conduit, a valve responsive to engine temperature acting to close said vacuum line when the engine temperature falls below a predetermined value, an electric circuit for operation of said electromagnetic means, said circuit including a switch sensitive to vehicle velocity and acting to [de-energize] *energize* said electromagnetic means when the vehicle velocity exceeds a predetermined value, an additional fuel supply system connected to said intake passage and having a valve operated by vacuum pressure, and a third conduit connected to said second conduit to close the latter said valve to cut off the additional fuel supply when the spark is retarded.

2. The combination set forth in claim 1 in which said three-way valve vents said second conduit to atmosphere through a restricted orifice when said first conduit is connected to said vacuum line.

3. The combination set forth in claim 1 in which said three-way valve vents said first conduit to atmosphere through an unrestricted opening when said second conduit is connected to said vacuum line.

* * * * *